United States Patent [19]

Mintz et al.

[11] Patent Number: 4,581,112
[45] Date of Patent: Apr. 8, 1986

[54] METHOD AND APPARATUS FOR SEPARATING WAX/WATER FROM HYDROCARBON MIXTURE BOILING IN THE LUBRICATING OIL RANGE

[75] Inventors: Donald J. Mintz, Summit; Anthony M. Gleason, Westfield, both of N.J.

[73] Assignee: Exxon Research and Engineering Co., Florham Park, N.J.

[21] Appl. No.: 722,163

[22] Filed: Apr. 11, 1985

[51] Int. Cl.⁴ .......................... B03C 5/00; B03C 5/02; C10G 33/02
[52] U.S. Cl. ..................................... 204/188; 204/302
[58] Field of Search ............... 204/186, 188, 302, 308; 210/748, 243

[56] References Cited

U.S. PATENT DOCUMENTS 2,054,273 9/1936 Subkow .............................. 204/303

Primary Examiner—Howard S. Williams

[57] ABSTRACT

For separating wax particles and/or water droplets from a hydrocarbon mixture boiling in the lubricating oil range, net positive or net negative free excess electric charge is introduced, e.g. by a charge injector (44), into the wax/water-laden oil mixture. The oil is brought into contact with at least one collector surface, which can be provided by a bed of closely packed beads (33) in a separation vessel (6) or, for separating wax particles, a rotating collector drum (61). The introduced charge attaches itself to the wax particles/water droplets and at the same time causes an induced electric field to be set up within the oil mixture. The electrophoretic effect produced by the interaction between the charge and the induced field causes the wax/water to collect on the collector surface and accumulate there, for separation from the oil mixture.

14 Claims, 5 Drawing Figures

METHOD AND APPARATUS FOR SEPARATING WAX/WATER FROM HYDROCARBON MIXTURE BOILING IN THE LUBRICATING OIL RANGE

BACKGROUND OF THE INVENTION

This invention relates to methods and apparatus for separating wax particles and/or water droplets from a hydrocarbon oil mixture boiling in the lubricating oil range, in which mixture the wax/water forms a dispersion. The term "wax particles" herein means wax in any particulate form and includes wax crystals. Furthermore, throughout this specification, it is to be understood that "hydrocarbon oil mixture" and "oil mixture" both mean a hydrocarbon oil mixture boiling in the lubricating oil range.

The problems of wax or water in lubricating oil are very well known in the art. In the distillation of crude oil, a proportion of wax is present in cuts taken in the lubricating oil range. Some of the wax remains dissolved in the oil, whereas other fractions form a haze as the oil fraction ages at ambient temperatures or below. Wax in itself is in fact a good lubricant but under comparatively low temperatures such as engine cold start conditions, its presence causes the oil to be thick and viscous and as a result the engine may be hard to turn over at sufficient speed during starting. In the case of water droplets, which include both very tiny water droplets (less than about 1 mm in diameter and exemplified by approximately 1 to 100 micron diameter droplets) and water molecules suspended in the lubricating oil, they detrimentally affect the lubricating properties of the oil and increase engine wear and corrosion. Haze manifests itself as a milky or cloudly appearance in the oil and is usually caused by either water or wax or both water and wax being present in the lubricating oil. Typically a minimum of about 50 ppm. of water or a minimum of about 0.1% by volume of wax will cause some lubricating oils to look hazy. Therefore the existence of haze caused by the presence of water droplets or wax crystals or particles detrimentally affects the performance of lubricating oils. It is of paramount practical importance to devise techniques for removing wax and/or water haze from lubricating oil in a relatively inexpensive, simple and effective manner, which techniques are also capable of implementation on an industrial scale.

DESCRIPTION OF THE PRIOR ART

Techniques have been available for many years which enable wax and water to be separated from oil. One broad category of separators is electrofilters. In many known electrofilters, an electric field is applied across a body of oil to be treated, by means of external electrodes. Many patents relate to electrofilters of this kind, but examples for electrofiltration of wax-laden oil are to be found in U.S. Pat. Nos. 2,031,210; 2,039,636; 2,053,552; and 2,174,938 (all Dillon et al). Examples of patents which disclose dewaxing oil by application of electrical windage or ionizing electric field are U.S. Pat. Nos. 2,042,887 (Fisher et al); 2,109,125 (Aldridge et al); 2,109,130 (Fisher); 2,109,131 (Fisher); and 2,300,283 (Fisher).

U.S. Pat. No. 1,940,654 (Stanton) disclosed a petroleum dewaxing technique based on electrophoresis. Two possible mechanisms are described by which the technique imparts charge to the wax crystals, i.e. direct contact charging and charging by passing the crystals through a glow or brush discharge (comprising bipolar gas-phase ions).

In U.S. Pat. No. 4,139,441 (Bose), electrofiltration in an electrostatic field is improved by subjecting the liquid to be treated to pretreatment in an oscillating electric field. The patent mentions the possibility of separating wax from lubricating oil. Electrofiltered solids are collected by adherence to surfaces of for example spherical glass beads maintained in the main electrostatic field.

In U.S. Pat. No. 4,194,956 (Sequine), wax is removed from high-resistivity oils by passing the oil through interstitial spaces defined within a mass of ceramic beads, across which a non-uniform electric field is maintained.

Space-charge field precipitation methods are disclosed in U.S. Pat. Nos. 3,129,157 (Loeckenhoff) and 3,489,669 (Ruhnke) in which a particle-laden liquid is passed through a corona point ionizer so that the particles become charged and the charged particles are collected on the inner wall surfaces of a dielectric conduit located downstream of the ionizer. Neither patent, however, specifically addresses the dewaxing (or dewatering) of lubricating oils.

U.S. Pat. No. 4,341,617 (King) uses sharply-pointed projections on one electrode of a pair of oppositely charged electrodes associated with a treating chamber in an electrostatic treater for waste liquid, to concentrate the electric field at the projection tips for encouraging flocculation of impurity particles carried by the waste liquid. In another arrangement, the projection tips inject charge carriers into the waste liquid and a resulting electrical current flow is established through the waste liquid between the two electrodes. The net positive charge due to the flow of positive ions in one direction exactly equals the net negative charge due to the flow of negative ions in the opposite direction. Again, this patent does not specifically refer to removing wax (or water) from lube oil.

Reference is also directed to U.S. Pat. No. 3,324,026 (Waterman et al) which discloses an electric filter for removing suspended contaminants from substantially water-free, high resistivity oils. The contaminated oil is flowed through the pores of individual elements of porous material forming a multi-element mass filling a treating space between two electrodes which maintain a high-gradient unidirectional electric field in the treating space. Before the oil is passed through the multi-element mass, it may be subjected to identical discharge or blast action by a plurality of relatively sharp pointed pins of one polarity facing but spaced from a member of opposite polarity.

Turning now to known electric methods of separating water from oil, in U.S. Pat. No. 2,108,258 (Fisher), agglomeration of water from a water-in-oil emulsion takes place due to the action of a high field gradient existing near a pointed electrode which is immersed in the emulsion. The field induces fluid motion which transports the water particles to a distinct water layer on which the emulsion is floating.

It is also known from U.S. Pat. No. 3,412,002 (Hubby) to break water-in-oil emulsions electrophoretically by charging the water particles in a stream of the emulsion by physical contact with a high voltage electrode and deflecting the charged droplets laterally with respect to the stream by a transverse magnetic field.

Finally, U.S. Pat. No. 2,245,551 (Adams et al) discloses separating water from oil by electrically treating the water-in-oil emulsion to convert the emulsion into a suspension of water droplets in oil and then passing the suspension upwardly through a stationary mass of glass fragments, themselves immersed in a body of water, whereby the water droplets coalesce with the body of water and clarified oil is removed from above the body of water while water is withdrawn from below.

The above-mentioned patents (apart from the aforementioned Loeckenhoff, Ruhnke, King and Waterman U.S. patents) are a representative selection of the several known techniques which specifically address electrically separating water or wax from oil. However, in complete contrast with the present invention, none of them (including the aforesaid Loeckenhoff, Ruhnke, King and Waterman U.S. patents) employs or suggests the introduction of free excess charge which is net positive or net negative and which attaches itself to the wax/water dispersed phase and also causes an electric field to be induced in the wax/water laden oil, whereby an electrophoretic interaction occurs which is harnessed to effect separation of the wax/water from the oil.

It is also remarked that known separation techniques such as described above can operate quite satisfactorily in practice, but have the disadvantage that they are not particularly effective in the case of wax, water or other contaminant particle or droplet sizes below a certain level (especially of the order of submicron-size or micron-size diameter—for example about 0.1 to 100 microns). This may be due to the fact that the electrostatic force acting on each individual particle due the applied electric field becomes insufficient, when the particle or droplet size becomes sufficiently small, having regard to the viscous drag forces exerted by the oil or continuous background phase and the maximum possible charge level on the individual particles or droplets.

One way in which the introduction of free excess charge which is net unipolar, mentioned above, can be achieved is by a charge injection technique, and in this regard, reference is directed to U.S. Pat. No. 4,255,777 (Kelly), assigned to the present assignees. This patent specifically discloses an electrostatic atomizing device and process for the formation of electrostatically charged droplets having an average diameter of less than about 1 millimeter for a liquid having a low electrical conductivity. Envisaged applications of the electrostatic atomizing technique are for spraying cleaning fluid onto the surface of an article to be cleaned, for spraying agricultural liquid, such as an insecticide, onto vegetation or soil, for spraying lubricant onto bearings and gears of large industrial machinery, for surface coating an article by spraying a solution of a plastic dissolved in a non-conductive liquid or an oil-based paint, to inject free excess charge into a molten plastic, glass or ceramic, and for spraying liquified plastic material for forming surface coatings. Another possible application is to produce charged droplets of liquid e.g. paint within a body of the same liquid which is in contact with a metal surface, so that the charged droplets deposit as a coating on the metal surface. Charged droplets of for example perfume could be sprayed onto oppositely charged powder e.g. talcum powder. Yet another application is the atomization of hydrocarbon fuels, for increasing combustion efficiency. However, the Kelly patent neither discloses nor suggests trying to charge a two-phase liquid comprising dispersed or suspended droplets or particles in a continuous liquid phase, nor appreciates that the charge introduced into the continuous liquid phase, transfers therefrom to the dispersed phase and that an electrophoretic effect occurs which causes migration of the dispersed phase in the liquid phase, nor even suggests any kind of application to electrical separation.

Finally, reference is directed to U.S. Pat. No. 4,435,261 (Mintz et al), assigned to the present assignees, which discloses a technique for the free radical polymerization of liquid monomers into thermoplastic polymers. Free excess charge is injected into the liquid monomer, so as to initiate polymerization of the monomer into a polymer.

SUMMARY OF THE INVENTION

The present invention relates to separating wax particles and/or water droplets from a hydrocarbon oil mixture boiling in the lubricating oil range, the wax/water forming a dispersion or suspension in the oil mixture. Free excess electric charge which is net unipolar, i.e. net positive or net negative, is introduced into the wax/water-containing oil mixture. The charge can conveniently be introduced by charge injection. The charged wax/water-containing oil mixture and at least one wax/water collecting surface are brought into contact with one another so that the wax/water collects, due to the electrophoretic migration of wax/water caused by the introduced electric charge, and accumulates on the wax/water collecting surface(s).

The electrophoretic migration arises due to an interaction which occurs between an electric field, which is self-induced in the oil mixture itself as the introduced electric charge becomes attached to the individual wax particles and/or water droplets, and the charge on the wax/water dispersed phase. Free charge introduced into the wax/water-containing oil mixture is positive or negative ions which, initially, are free to move through the continuous oil mixture phase. The continuous phase acts as a medium through which volumetric distribution of the introduced charge occurs, so as to establish the induced electric field in the mixture. The next step in the electrical separation process involves allowing the migrating dispersed phase to form into accumulations of charged wax/water dispersed phase on one or more collector surface(s) in contact with the hydrogen oil mixture.

It is stressed that the electric field is the result not of any voltage applied to any external electrodes so as to set up an electric field between those electrodes, but rather arises from the total introduced or injected charge distribution in the oil mixture and on the wax/water suspension and the collector surface regions where separation occurs.

A particularly convenient way of recovering the wax/water is to allow the migrating wax/water to form accumulations of charged dispersed phase on one or more collector surfaces inside a separation vessel containing the oil mixture.

The basis for the effective separation that can be achieved when putting this invention into effect is believed by the inventors to be as follows. The first step in the process is the production of an excess (i.e. net unipolar—positive or negative) charge density in the otherwise electrically-neutral oil mixture. Several techniques are available to produce a transient or steady-excess charge density. Broadly speaking, such methods fall into two general categories, namely: (1) injection of excess charge across the interface or boundary which confines the wax/water contaminated oil mixture, and (2) volumetric charge introduction techniques into the bulk of the oil mixture. Examples of the first category include electron beam and high energy particle radiation, photo-emission and charge transport by a moving fluid. Another example is charge injection as taught in the aforesaid Kelly U.S. Pat. No. 4,255,777, the contents which are expressly incorporated herein. Examples of the second category are photoionization of either or both of the wax/water suspension and the oil mixture and secondary ionization by thermalization of high energy particle irradiation of the contaminated oil mixture.

It is necessary that there be an excess of free charge in the oil mixture in the sense of a sufficient abundance that an effective migration of wax/water will occur. Typically, the density of the free charge would be of the order of $10^{16}$ charges per $m^3$. A lower limit would be about $1 \times 10^{10}$ charges per $m^3$. A typical preferred range of free charge density is about $1 \times 10^{13}$ to $1 \times 10^{19}$ charges per $m^3$ or even higher, for providing effective migration of the wax/water.

The charge introduced into any wax/water contaminated oil mixture stream to be clarified must be net negative or net positive. However, providing this requirement is met, then it is equally possible to introduce the excess charge using two streams of opposite but unequal levels of charge or alternating net positive and net negative streams for the purposes of wax or water agglomeration prior to collection, in the first case, or multilayer precipitation in the second case (e.g., collecting a net negative layer than a net positive layer, and so forth, of the wax/water dispersed phase).

The second step in the process is the transference of the major portion of the excess charge to the wax/water contaminants in the liquid. In a preferred way of performing the invention in which a charge injector, such as disclosed in the aforesaid U.S. Pat. No. 4,255,777, is used for introducing net unipolar free excess charge into a wax/water contaminant-laden oil stream, the stream issues from the charge injector as a continuous stream or spray through a gas or vapor space, and enters a separation vessel where a body of charged oil mixture is collected. The gas or vapor space is provided to enable the charged fluid to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective removal of contaminant whether the contaminated oil is sprayed by the charge injector or simply issues as a continuous stream into the separation vessel, particularly at relatively high velocity throughputs in the charge injector. However, when the wax/water contaminated oil is sprayed, the individual oil droplets are in general separated from one another and this can be important where lower throughput velocities, closer to the drift velocity of the individual charges, are employed. It is, however, remarked that it is important that there be no contact between the charged spray or stream passing through the gas or vapor space and any surrounding wall electrically connecting the separation vessel wall to the charge injector, in order to avoid charge dissipation. Suitably, the gas or vapor space is enclosed and a purge gas, e.g, nitrogen, circulated through the space to avoid any risk of explosion or chemical reaction. In addition, the purge gas helps to obtain uniform separation results irrespective of changes in ambient conditions, especially humidity, which if present could affect the rate of depletion of charge. In the absence of any such gap, reduced separation efficiencies will result. According to a development, the gas or vapor space is pressurized which can maintain a satisfactory throughput rate in the separation vessel even for rather viscous liquids and can increase the throughput rate for less viscous liquids. In the separation region, it is assumed that the excess charge density exceeds the oil mixture background charge density (i.e. the density of bipolar charge carriers which are intrinsic to the oil mixture and which result in the conductivity of the oil mixture); then the induced electric field in the separation region caused by the excess charge density will act on the individual charge carriers and drive them to the boundaries of the hydrocarbon oil mixture. Some of the charge will be intercepted by the wax particles and/or droplets as the case may be and the wax particles/water droplets will thereby become charged. The interaction which then occurs between the charged wax/water and the induced electric field causes the dispersed wax/water to migrate towards the boundaries of the oil mixture.

The next part in the process involves the accumulation of the migrating wax/water on the collector surfaces provided in the separation vessel. The charged wax/water will congregate on the collector surfaces and form into accumulations by interaction between the individual wax particles or water droplets. This will manifest itself in the form of agglomeration and coalescence (for water droplets) or merely agglomeration and deposition in the case of wax particles.

Finally, accumulated wax/water needs to be removed or separated from the oil mixture. For collected water, the water droplets continue to coalesce until sufficiently large droplets are formed on the collector surfaces that they separate from the collector surfaces under gravity and re-enter the bulk oil mixture as very much larger droplets. These droplets are allowed to settle to form a distinct continuous water phase on the separation vessel, which can then be separated, for example by tapping off, from the oil mixture. Other separation techniques which are well known in the art, for example centrifuging, can be used instead. Alternatively, the microscopic water droplets may congregate on the collector surfaces and on the separation vessel walls without any appreciable droplet size growth or settling, leaving clarified oil mixture in the bulk of the separation vessel interior which can then be discharged. Both effects may occur at the same time. In the case where wax is collected, periodic cleaning of the collector surfaces by backflushing, solvent washing, heating, and other techniques which are well-known to those in the art can be used. This would be appropriate for collector beads for example. For a drum collector surface or other moving surface, the wax can be scraped off by a stationary scraper blade.

It is to be noted that when using a charge injector to introduce the net unipolar free charge, it is important that the stream velocity through the charge injector is high enough to transport the charged stream away from the electrode region of the charge injector. Ideally, the stream velocity needs to exceed the drift velocity relative to the liquid of the individual charges induced by the electric field produced by the charge injector electrodes. On the other hand, the wax/water-laden oil mixture in the separation vessel needs to remain there long enough to enable adequate wax/water contaminant to be collected and separated from the oil mixture. This generally requires a comparatively long residence time in the separation vessel and therefore a much lower velocity throughput in the separation vessel than in the charge injector. Typical values for the throughput velocities in the charge injector and separation vesel are 1 m/sec and 0.05 to 1 cm/sec, respectively. In another embodiment the internal cross-sectional diameters of the separation vessel and the injector orifice diameter are for example 5 to 10 cm and 0.025 cm, respectively. These are purely exemplary and have no limiting character.

It is to be noted that either "batch" or "continuous" electrical treatment of the oil mixture can be effected. In batch treatment, the oil mixture to be treated is suitably introduced into the separation vessel, after having free charge introduced into the oil mixture, and the collected wax/water is recovered in any suitable way, such as described above. Afterwards, the clarified oil mixture is discharged from the separation vessel and then the next batch introduced into the separation vessel for treatment. In a modified form of batch treatment, the oil mixture is continuously recycled through the charge introduction stage followed by the separation vessel and then back to the charge introduction means, until the required level of clarification of the oil mixture is achieved. In the "continuous" recovery process, the oil mixture is continuously passed through the successive stages of the wax removal process.

With the present invention, it is possible to provide an apparatus and method for the effective separation of wax particles and/or water droplets from an oil mixture, even where the mean wax particle/water droplet size is very small (e.g. of the order of 0.1 micron to 1 mm in diameter).

The wax/water separation apparatus can be made to be simple in construction and reliable in operation, whilst a contaminant separation method can be provided which is simple to put into effect. With the invention, it is possible to attain a high level of purity of the clarified oil mixture.

Where the oil mixture is initially at an elevated temperature such that it contains dissolved wax, the oil mixture can be cooled to precipitate dissolved wax as wax particles or crystals. Preferably in addition, an oil solvent is added to the oil mixture. "Oil Solvent" as used throughout this specification refers to those solvents which when added to an oil mixture result in a lower viscosity for the solvent-oil mixture than for the oil mixture alone. This is beneficial for enhancing the settling, filtration or other wax separation processes used to separate the charged precipitated wax particles from the solvent-oil mixture. Usually, the oil solvent will have the additional property of having a higher solubility for the oil mixture than for the wax at any given temperature, so that during chilling of the solvent-oil mixture to precipitate wax, the wax precipitation is enhanced. Preferably, the oil solvent is an alkane or alkene whose molecular weight is between 16 and 114, or any other oil solvent, wax anti-solvent whose electrical conductivity is less than about $10^{-8}$ (ohm. m),$^{-1}$. Suitably, the temperature of the wax-containing oil mixture is in the range 140° F. to 200° F. before it is mixed with the oil solvent whose temperature is in the range of 60° F. to 200° F. These temperature ranges help to ensure that the oil mixture dissolves throughly and readily in the oil solvent.

For separating wax and/or water from the oil mixture one preferred arrangement is to use a separation vessel with collector surfaces inside it as has already been described in some detail above. The collector surfaces may comprise a bed of densely packed collector beads of low electrical conductivity material, e.g. glass or ceramic beads, to which the charged wax particles/water droplets migrate and collect. In another embodiment, however, a quantity of the charged wax-containing oil mixture is maintained in contact with a moving collector surface so that the wax deposits on said collector surface and is transported on said moving collector surface from said quantity of charged oil mixture. Conveniently, the wax transported on the moving collector surface from said quantity of charged oil mixture is scraped off the or each collector surface by a stationary scraper. The collector surface may be an endless surface, e.g. the outer cylindrical surface of a drum continuously rotating about its central longitudinal axis, which is continuously moving so that the surface moves into contact with said quantity of charged oil mixture to collect a deposit of wax, transports the wax to a location where the wax deposit is mechanically substantially removed, for example by being scraped from the surface, and the thereby cleaned surface returns for contact again with said quantity of charged oil mixture. Suitably, the quantity of charged wax-laden oil mixture is contained in a trough and the moving collector surface(s) are partially submerged in the charged oil mixture in the trough.

The invention provides, from another aspect, apparatus for separating wax particles from hydrocarbon mixture boiling in the lubricating oil range, in which mixture the wax forms a dispersion, the apparatus comprising a rotary collector drum, providing an outer cylindrical wax collector surface, means arranged to rotate the drum about a substantial horizontal axis, means for introducing net positive or net negative electric charge into the wax-containing oil mixture, and means for maintaining a quantity of charged wax-containing oil mixture in contact with the outer cylindrical surface of the collector drum, so as to cause wax particles to collect and deposit on the drum collector surface while the drum rotates, due to the electrophoretic migration of the wax particles caused by the introduced electric charge, and be separated by the drum rotation from said quantity of charged oil mixture.

The means for maintaining a quantity of charged wax-containing oil mixture in contact with the outer cylindrical surface of the collector drum suitably comprises a trough inside which said rotary collector drum is positioned with its wax collector surface partially submerged in the charged oil mixture in the trough. A scraper positioned immediately adjacent the drum collector surface for scraping deposited wax off the drum collector surface as the drum rotates.

It will be appreciated that the invention is not limited to separating either wax or water from the lube oil mixture. They can usually both be removed from the lube oil at the same time. Furthermore, the invention is not selective for removing only wax and water from lubricating oil, but will also be effective for separating other contaminant particles such as grit, catalyst fines, asphaltene particles, oxide scale, corrosion scale and other corrosion products, coke fines and the like which may also be present with the wax either singularly or in some combination.

BRIEF DESCRIPTION OF THE DRAWINGS

For a better understanding of the invention and to show how the same may be carried into effect, reference will now be made, by way of example, to the accompanying drawings, wherein.

DESCRIPTION OF THE PREFERRED EMBODIMENTS

Figure 1:
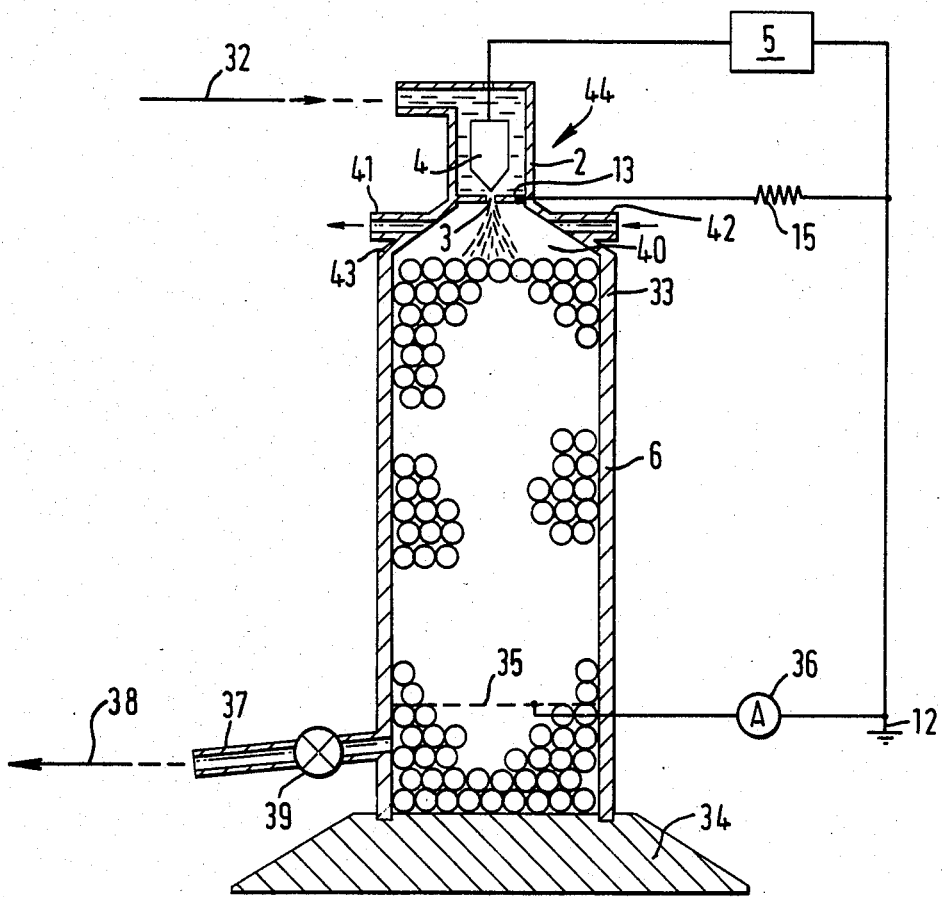
FIG. 1 is a diagrammatic, vertical sectional view through a first embodiment of the invention which is suitable for separating wax particles from wax-laden lubricating oil.

With reference to FIG. 1, waxy lubricating oil to be treated containing wax particles is introduced along a supply line, diagrammatically shown at 32, into a charge injector 44 which, in this example, is constructed in accordance with the teaching of the aforesaid U.S. Pat. No. 4,255,777 (the contents of which are hereby incorporated herein by reference), to which reference is made for a more complete disclosure of the construction and operation of the charge injector 44. Although the charge injector is described in detail in the aforesaid U.S. Pat. No. 4,255,777, its construction will now be briefly described. It essentially comprises an upright, suitably cylindrical, chamber 2 through which the waxy oil passes, having a bottom wall 13 with a central opening or orifice 3, and a sharply-pointed electrode 4 positioned inside the charge injector chamber and electrically connected to a high voltage power supply 5, the tip of the electrode 4 being located closely adjacent to, and in axial alignment with, the opening 3. The chamber bottom wall 13 serves as a second electrode which is maintained at a lower voltage, relative to earth, than pointed electrode 4, by means of a connection to earth, which can be a direct connection or, as shown, through a resistance element 15. Free excess charge is injected from the pointed tip of electrode 4, by the electrode pair 4, 13, into the mixture of wax-laden oil and propane, which issues through the orifice 3 and streams or sprays, through gas or vapor space 40, into a separation vessel or reservoir 6 which is located below the charge injector 1. The stream issuing downwardly through opening 3 may break up from a stream into a spray at a short distance below the opening 3, depending on the charging potential of the charge injector, but the existence of a stream or spray is not critical to the effective operation of the wax separation apparatus. The gas or vapor 40, in this example, is enclosed by a frustro-conical cap 43 of the separation vessel on which the charge injector body is mounted. A purge gas e.g., nitrogen, may be circulated through enclosed gas space 40, using gas inlet and outlet pipes 41, 42, respectively, extending through the wall of cap 43. In another development, the pipes 42, 41 are used for pressurizing the gas space 40.

Another possibility is for space 40 to be an air space in communication with the ambient atmosphere, but such an arrangement is satisfactory only in situations where there is no risk of explosion or unwanted chemical reaction.

The injector 1 injects free charge of single polarity (positive or negative) into the waxy oil stream and this stream issues from the injector downwardly through the gap 40 onto a bed of densely-packed beads 33, made of glass, ceramic or other material of low electrical conductivity, which fill substantially the entire inside space of vessel 6 which conveniently is an upright, preferably cylindrical, glass columnar vessel supported on a base stand 34. A metal screen or gauze 35 to which a wire is attached and which is grounded through an ammeter 36 collects the charge carried by the oil in the separation vessel. The screen 35 is shown with beads 33 above and below it, but instead the screen could serve as a supporting screen with the beads positioned on top of it, only. The ammeter provides a measure of the charge rate and, with the oil flow rate, the charge density which is useful in determining the operating parameters of the charge injector, and completes the electrical circuit for the injected charge. An outlet 37 is provided in the wall of the vessel at a location below the top of the bed of glass beads 33, and preferably close to the bottom on the separation vessel. The outlet pipe 37 is directed at a shallow angle below the horizontal and discharges into an oil rundown line 38. A controllable valve 39 in pipe 37 is periodically opened to release clarified oil from the bottom region of vessel 6 into container 38.

In operation, with valve 39 closed and already clarified oil mixture covering the beads 33, excess charge of one polarity is injected by the charge injector 1 into the stream of waxy oil. The charged mixture flows over the bed of beads 33 and charged mixture already in vessel 6. The electric charge injected into the waxy oil becomes attached to the wax particles (or crystals) which are made up of the wax particles which were present in the untreated wax-laden oil feed. Concomitant with the wax particles becoming charged, a resulting induced electric field is established within the oily mixture in the separation vessel. The interaction between the self-induced electric field and the charged wax particles produces an electrophoretic force which causes the wax particles to migrate generally towards the boundaries of the charged oily mixture.

Preferably, as shown, the level of oily mixture in vessel 6 just covers the top layer of beads, in order to keep the wax migration path length to the nearest glass beads to a minimum, but this is not essential. Migration of the wax then occurs within the oily mixture in the separation vessel towards the inside wall surfaces of the vessel 6, but the migrating wax particles encounter the outer surfaces of the beads generally before reaching the vessel wall surfaces and so become deposited principally on the beads. The clarity of the oil mixture increases towards the bottom of vessel 6, and clarified oil is removed through outlet pipe 37 by opening valve 39 and led to the rundown line 38 from where the clarified lubricating oil is discharged.

The clarified oil can be periodically tapped off, while ensuring that the wax-laden oil level in separation vessel 6 never reaches the charge injector. Alternatively, the clarified oil may be continuously run off at a rate controlled by the setting of valve 39 and the feed of wax-laden oil to the charge injector regulated manually or automatically to maintain the oil level just covering the beads. From time to time, it may be necessary to replace beads 33 with new ones or to remove the soiled beads, clean them and then reintroduce them to vessel 6. Alternatively, the beads may be regenerated or cleaned in situ. Various known techniques may be used for this purpose and need not be further described herein.

It is to be noted that if the oil to be treated is initially at an elevated temperature such that a proportion or the whole of its wax content is in the form of dissolved wax, then the oil, preferably diluted with oil solvent, firstly needs to be cooled down sufficiently to precipitate the wax, and then it can be fed along supply line 32 to the charge injector. In this case, the wax-containing oil feed will include oil solvent which will be passed through the charge injector and separation vessel, and then discharged, together with the clarified oil, along rundown line 38. A solvent recovery unit (not shown) in line 38 can be used for recovering the oil solvent from the clarified oil. Solvent recovery units are well-known in the art and need not be further described herein. Where a vaporizable oil solvent is used such as liquified propane, propane vapor will fill enclosed space 40, in which case only a single pipe 41 is required which serves as a vent for propane vapor or which leads to a propane recovery unit.

Figure 2:
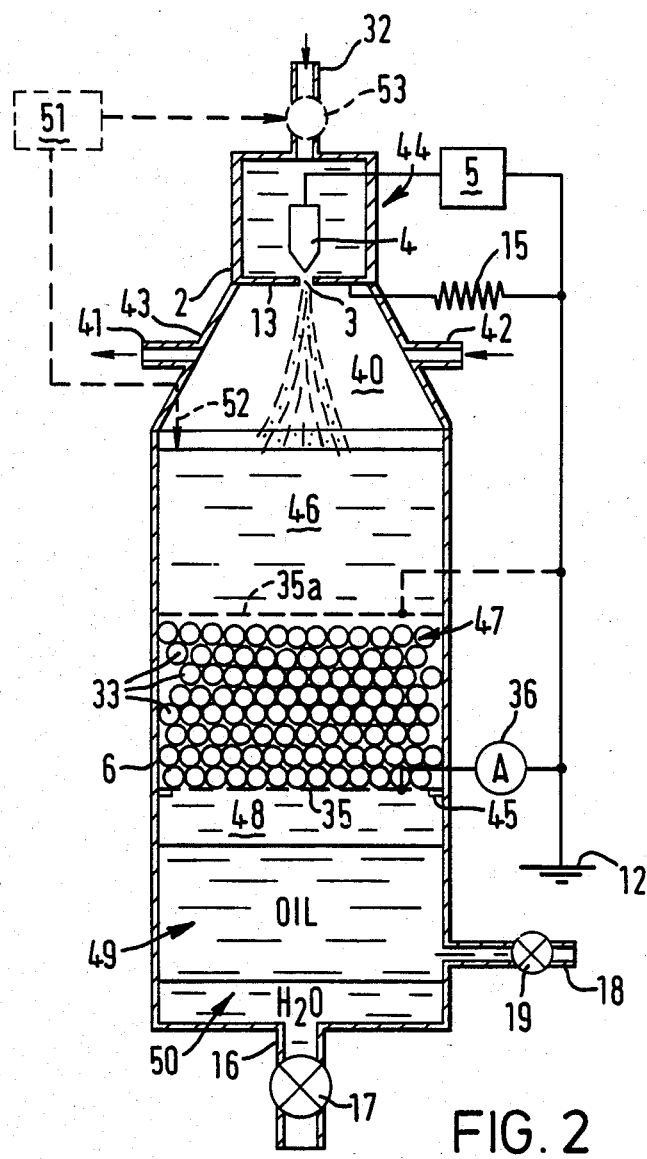
FIGS. 2 and 3 are similar views of two modified embodiments adapted for removal of water droplets, and any wax particles that may be present, from lube oil.

A similar separation apparatus, adapted for dewatering or dehazing lubricating oil, is depicted with reference to FIG. 2, in which the same references as are used in FIG. 1 denote the same or corresponding parts. Referring to FIG. 2, a mixture consisting of a water-in-oil emulsion or hazy oil (containing both water droplets and wax particles) is introduced through line 32 into the inlet of the charge injector 44. Net unipolar free excess charge is injected into the oil which is discharged downwardly into the separation vessel 6.

A horizontal metallic gauze 35, located within vessel 6 approximately half-way up its height on an internal supporting shoulder 45 and connected to earth 12 through diameter 36 to complete the electrical circuit of the charge injector, supports a bed of densely packed, electrically insulative, collector beads 33, for example glass beads, but they may instead be made of other materials of low conductivity, e.g. plastics or ceramics generally. These beads occupy approximately half of the volume within vessel 6 above the gauze 35. An alternative location for the gauze electrode is when it covers the collector beads 33, as shown at 35a in FIG. 2. In this arrangement, other means for supporting the bed of collector beads 33 would need to be provided.

Thus, the vessel interior is divided, working from the top downwards, into an uppermost section 46 which is free of any collector surfaces apart from the internal wall surface regions of vessel 6 and which constitutes a primary conglomerating or coalescence region, a section 47 which is occupied by the beads 33 and which serves as a secondary conglomerating or coalescence region, and separation region 48 in which a mixture of oil and coalescing water droplets breaks up into a charged water-in-oil layer 48, an oil layer 49 and a water layer 50. The smallest dimension of the uppermost section 46 should preferably be at least 100 times greater than the initial average distance between individual water droplets and also as between any individual wax particles that may be present.

It is noted that if there were no primary coalescing region provided by section 46 devoid of any beads, separation of the water and any wax might not in every case be wholly effective with very small droplet and wax particle sizes, but this drawback is overcome in the present embodiment because the primary coalescing region 46 allows the droplets and wax particles to coalesce and grow to a sufficient size that effective separation can occur in the bead separation region. On the other hand, the primary coalescing region 46 is not essential in every embodiment, especially where comparatively large water droplets and wax particles are present or even for smaller contaminant sizes, where the resulting concentration of comparatively small water droplets or dissolved wax and minute wax particles in the discharged clarified oil is acceptably low.

The separation vessel 6 is provided in the bottom thereof with an outlet pipe 16, including a valve 17, for discharging water from the separation vessel. Similarly, the vessel 6 has in its side wall an outlet pipe 18, including a valve 19, located above the oil/water interface for releasing clarified oil from vessel 6.

It is to be noted that because of the very large cross-sectional area of the interior of vessel 6 as compared with that of the stream of charged phase mixture emerging through outlet 3, the stream velocity through the charge injector 1 is relatively high, so as to ensure an adequate level of charge injection, whereas the downward movement of the liquid mass in vessel is very small (and hence its residence time is comparatively large), so as to allow sufficient time for the electrophoretic effect established in the separation vessel to bring about the necessary separation of water and wax. Typical dimensions for the internal cross-sectional diameter are 10 cms and 0.005 cms respectively.

In operation, with valves 17 and 19 set to determine flow rates for water and clarified oil which match the flow rate through charge injector 1, or by selective opening and closing valves 17, 19 so as to maintain the liquid mass in vessel 6 at an approximately constant level close to the top of the separation vessel, excess charge carriers are induced to be emitted from the sharply pointed end of electrode 4 when this electrode is maintained at a sufficiently high negative potential with respect to spray opening 3. The charge carriers are then swept from the pointed electrode 4 by the cross flow of the water-in-oil emulsion or hazy oil to be clarified issuing through the orifice 3. Within upper region 33, the major portion of the injected charge has transferred to the water droplets and any wax particles, so as to drive the water droplets and wax particles towards the bounding wall surfaces of separation vessel 6. The internal dimensions of separation vessel in region 46 are preferably chosen to be much larger (typically 100 times or more) than the mean inter-droplets and inter-particle spacing within the continuous oil phase. In this way some degree of coalescence of the migrating water droplets and of the wax particles will occur within region 46 before the droplets and particles reach the internal wall surfaces of the separation vessel, and larger water droplets and wax particles are thus formed. Other migrating droplets and particles will reach the inner wall surfaces of the separation vessel and coalesce there, to form larger water droplets and wax particles. The water droplets may break away from the wall surfaces, or a surface water film may be formed on the separation vessel wall to promote settling of the water. The wax particles formed adjacent the wall surfaces will in the main become attached to the wall surfaces. The larger water droplets as formed in both ways start to settle, due to the effects of gravity and downward flow within separation vessel 6, the downward settling being superimposed on the droplet migration in the generally radial direction, and these water droplets, together with any wax particles coalescing in the oil in region 46, accordingly encounter the collector beads 33 in section 47, on whose exposed surfaces the droplets coalesce further, until they become detached from the bead surfaces and separate out to form the bottom, water layer 50. The wax particles, however, become attached to the bead surfaces and continue to deposit there.

It will be appreciated that the close packing of the beads provides very short migration paths for the water droplets and wax particles to enhance the dewatering-/dehazing. The oil from which the water droplets and wax have been removed tends to separate out into oil layer 49 floating on top of water layer 50, water-in-oil emulsion or hazy oil occupying the remainder of the volume taken up by the liquid mass in vessel 6 and which fills section 46, the interstices between the beads, and water/oil layer 48. Where valves 17, 19 are set to define predetermined flow discharge rates for the clarified water and oil phases, an optional level control arrangement can be used to keep the level of charged water-in-oil emulsion or hazy oil in section 46 substantially constant, this arrangement comprising a controller 51 which responds to the level detected by a level sensor 52 and controls the opening of a regulator 53 in the input line 32 to the charge injector 44 so as to reduce any error between the output from level sensor 52 and an input signal representing the desired level.

Figure 3:
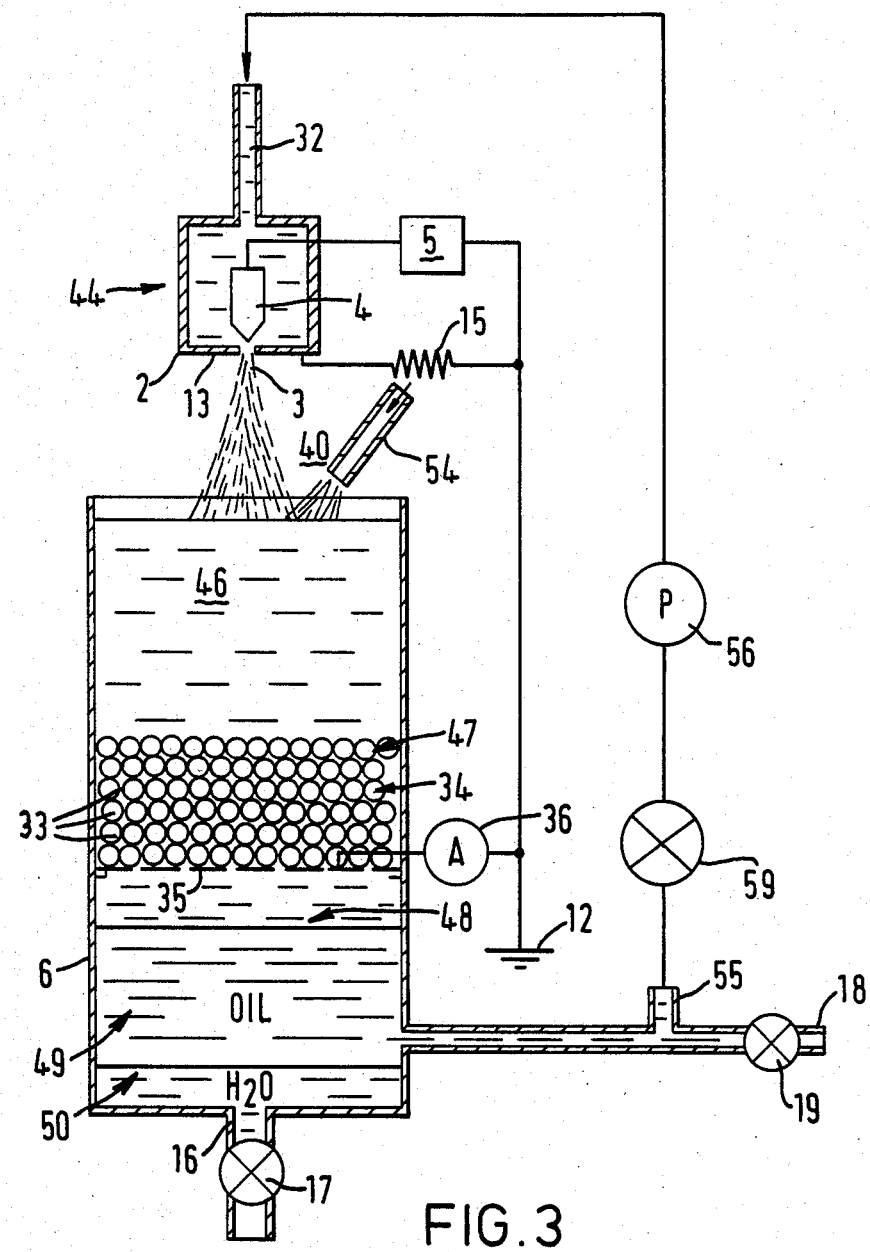

The apparatus depicted in FIG. 2 will generally operate satisfactorily for water-in-oil emulsions. However, in the case of waxy oil, there may in certain circumstances be a likelihood of wax depositing and building-up with time in the region of opening 3, thus unfavourably affecting the charging efficiency of the charge injector and resulting in partial or complete blockage ultimately. The embodiment shown in FIG. 3 is designed to overcome these shortcomings. Here, the wax contaminated oil is kept separate from the charge injector and passed along a delivery pipe 54 from which it is discharged through air gap 40 into upper section 46 of separation vessel 6. Here the air gap is shown in open communication with the surrounding atmosphere. Suitable support means for supporting the charge injector 44 above the separation vessel 6 is not shown but can comprise a frustro-conical cap as in the FIGS. 1 and 2 embodiments. A line 55, including pump 56 and control valve 59, branches out from outlet pipe 18 upstream of valve 19 and leads back, via line 32, to the inlet of charge injector 44. Therefore, the oil into which charge is injected is substantially free of wax. In this way the above-mentioned problem of depositing wax is overcome. The charged contaminant-free oil issuing from charge injector 1 and the uncharged wax and water-laden oil discharged from delivery pipe 42 are brought into contact with one another in upper section 46 of the separation vessel and mix there. Charge transfers in this region to the hazy or waxy oil. In all other respects, the operation of this modified separation apparatus is the same as is the FIG. 2 embodiment. As before, a level control arrangement can optionally be employed.

In the FIGS. 2 and 3 embodiments, as already mentioned, it is not essential that there be a primary coalescing region 46. This region allows some coalescence and growth of wax particles and/or water droplets to occur, which is beneficial as a preliminary to the further coalescence occurring in the bead region 47, especially for very small initial droplet and particle sizes. However, the beads can occupy not only the bead region 47 but also the primary coalescing region 46 and this arrangement will result in adequate separation effectiveness in many practical applications.

In addition, it is possible, as in the FIG. 1 embodiment, to add liquid propane or other oil solvent to the feed, where the feed contains dissolved wax, and then to cool the solvent/oil to precipitate dissolved wax, before introducing the feed into the charge injector. It is also to be noted that in each of FIGS. 1 to 3, where an oil solvent is used, it could in a modification be introduced directly into the separation vessel 6 instead of into the chilled oil feed to the charge injector. Another possibility is to inject charge into the oil solvent, and then introduce the charged oil solvent into the oil feed which can then be directed by a nozzle for example into the separation vessel. Alternatively the charged oil solvent and oil feed could be separately introduced into the separation vessel. In both cases, the advantage is achieved that charge is injected into the oil solvent as opposed to the wax-laden oil which avoids the problem which can otherwise occur in some circumstances where wax deposits build up in the charge injector, particularly in the charge injection region, and this can affect the charging performance or efficiency.

Figure 4:
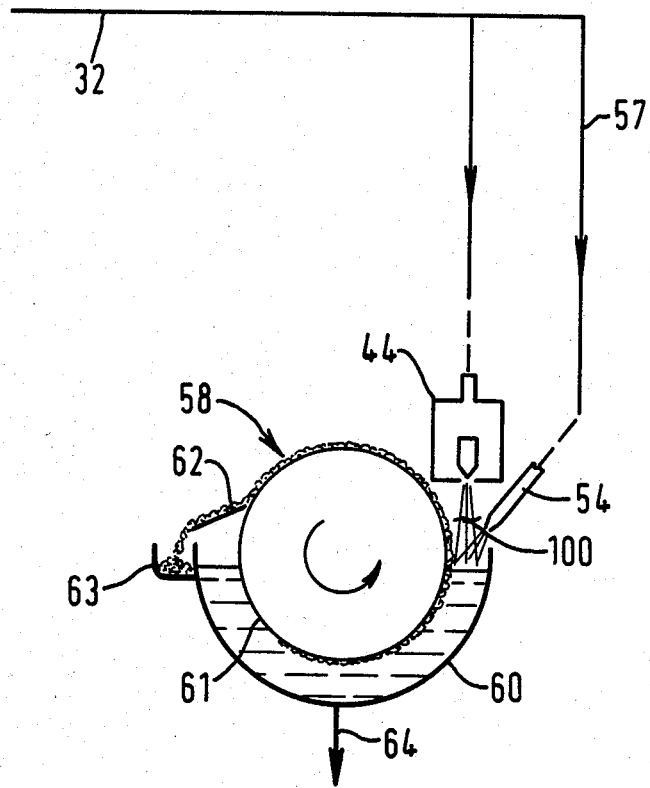
FIG. 4 is a schematic view of a different form of separation apparatus which is specially designed for separating wax from lube oil and uses a drum collector for this purpose.

Referring now to FIG. 4, there is diagrammatically illustrated an apparatus that is especially designed for separating wax from wax-laden lubricating oil. The oil may have been previously partially dewaxed and may contain propane or other oil solvent, but in this example, the wax particle laden lube oil contains no oil solvent. Typically, the oil may contain 0.01% to 30% wax. Line 32 leads to charge injector 44, which is of the same construction as the charge injector 44 of FIGS. 1 to 3.

Positioned below the charge injector is a drum separator 58 which comprises a part-cylindrical trough 60, into which the charged waxy oil slurry from the charge injector is discharged, through a gas or vapor space 100, and a rotary wax collector drum 61 which is arranged inside the trough, coaxially thereto, leaving a comparatively small radial gap between the drum surface and the inside, part-cylindrical surface of the trough. The drum surface is made of electrically conductive or non-conductive material (e.g. metal, glass or other solid material) and serves as a collector surface for wax. The gas vapor space 100 provides the same function as the gas or vapor space 40 in the FIGS. 1 to 3 embodiments and similar comments to those made hereinabove in connection with those embodiments will equally apply to gas or vapor space 100. However, it is remarked that it is preferred for the enclosure required not only to enclose space 100 but also to enshroud the entire exposed portion of the drum 61 above the level of the oil/propane slurry in the trough 60.

It will be noted that in the illustrated embodiment a bypass line 57 diverts a proportion of the uncharged waxy oil slurry away from the charge injector and introduces the diverted proportion directly, through delivery pipe 54 and gas or vapor space 100, into the trough 60 where the uncharged slurry mixes with the charged slurry so that the charge becomes uniformly distributed on the wax particles in the slurry in the separator trough. The reason for this arrangement is that there is a practical limitation on the throughput which any given charge injector can handle and in order to achieve large scale dewaxing without for example having to use several charge injectors connected in parallel, the bypass line arrangement shown in FIG. 4 is advantageous.

In operation, wax-laden oil to be treated is fed along line 32, and then divided into two streams, one of which passes through charge injector 44 and the other flows along bypass line 57. The charged and uncharged slurries are directed through gas or vapor space 100, into the trough 60 of drum separator 58. The collector drum 61 is rotated in the direction indicated by the arrow. The electrophoretic force which is set up in the waxy oil slurry in the radial gap between trough 60 and drum 61 causes wax particles to migrate to the drum surface and become attached thereto by electrical attraction and physical adhesion. In this way, wax collecting on the drum surface is carried upwardly by the rotating drum out of the charged slurry in the trough and conveyed to a location at which a scraper blade 62, positioned immediately adjacent the drum surface, acts to mechanically scrape the wax off the drum surface. The wax removed in this way is collected in any convenient way such as by a wax conveyor. For simplicity in FIG. 4, however, a wax receptacle 63 is shown which is periodically emptied. The relatively clean drum surface remaining after the wax has been scraped off then re-enters the charged slurry in the trough 60, with further rotation of drum 61, and then further wax starts to deposit on that surface. It is to be noted that the drum only needs to rotate comparatively slowly (e.g. 0.1 to 5 r.p.m.) in order that a sufficiently thick layer of wax can be deposited before the wax layer reaches the location of the scraper blade 62. The charged slurry in the upper region contains a relatively high concentration of wax (similar to that of the charged slurry delivered by charge injector 44) whereas the oil in the lower region of the trough 60 is comparatively wax-free. This substantially wax-free oil is tapped off from the trough, periodically or continuously, along line 64.

A possible modification to the FIG. 4 embodiment, particularly in regard to solvent dewaxing, is to direct uncharged solvent onto the separator drum 61 of the separator 58 where the oil solvent mixes with charged chilled waxy oil, which may be diluted with oil solvent (instead of introducing the oil solvent into the uncharged waxy oil feed). Another possibility is to direct uncharged chilled waxy oil, which may be diluted with oil solvent, onto the drum 61 while simultaneously directing charged oil solvent or charged wax-free oil at the drum 61. Corresponding modifications could be effected with the FIG. 3 embodiment, with the charged and uncharged streams separately directed into the separation vessel 6 from above. The foregoing description will now be illustrated by way of two examples.

EXAMPLE 1

An experiment was run using micron-size water droplets dispersed in a variety of lube base stocks and paraffinic white oils. The experimental apparatus was as shown schematically in FIGS. 2 and 3. In both cases charge was injected and charge transfer and droplet coalescence occurred in the upper or coalescence section of the separation vessel. The emulsion now containing larger water droplets was passed through the bed of packed glass beads. As the charged emulsion passed through the bed large water droplets settled out on the bead surfaces. Some of the water adhered to the bead surfaces while the rmainder drained off into the emulsion where it settled into a water layer at the bottom of the separation vessel.

The water was introduced into the oils by either contacting the oil with steam or by subjecting the oil and added water to a high velocity shear. The resulting water-in-oil emulsion was allowed to settle for 12 hours and a sample decanted from the top of the separation vessel. The water content was measured before and after the experiment using a variant of a Karl Fischer titration technique. The average size of the water droplets was of the order of 2 microns in diameter as determined by optical microscopy. Injected charge densities of $\sim 0.2$ Cm$^{-3}$ were employed and flow rates of 12 cm$^3$ s$^{-1}$ were maintained through the charge injector. The power dissipated was $\sim 50$ mw during the run. The sample size was 1 liter and the flow rates through the packed beads comprising 0.4 cm beads varied with the sample concerned but was no greater than 10 cm$^3$ s$^{-1}$. The bed height was 12 cm and diameter was 8 cm. Passing the emulsion through the apparatus without charge injection resulted in removal of some of the water ($\sim 50\%$). This number varied considerably. However, when the charge injector was switched on, the results set out below were obtained. The results listed in the table are the best results of a series of experiments and show the effectiveness of the separation technique.

TABLE

Best Results of Charged Fluid Coalescence Tests Coalescence Tests for Several Viscous Oils with Added Dispersed Water

| Feed | Viscosity @ 20° C. (cp) | Excess H$_2$O (ppm) In | Excess H$_2$O (ppm) Out |
| --- | --- | --- | --- |
| Marcol 52 (white oil) | 11 | 820 | 8 |
| SI50N (lube base oil) | 55 | 531 | 8 |
| Marcol 52/Primol 355 (white oil mixture) | 95 | 355 | 5 |
| Primol 355 (white oil) | 155 | 630 | 32 |
| S600N (lube base oil) | 255 | 800 | 8 |
| S600N (lube base oil) | 255 | 7000 | 400 |
| Bright Stock (lube base oil) | 2100 | 550 | 70 |

EXAMPLE 2

By way of a second example, it has been demonstrated that wax crystals, which may be present as a dispersed contaminant phase in a lubricating oil, may be made to agglomerate in the bulk of the liquid by the injection of free excess charge.

Marcol 52, a highly refined white oil manufactured by Exxon Chemical Company, was mixed with a waxy raffinate from a commercial lubricating oil dewaxing plant which contained 15% wax. The wax content of the final mixture was 0.25%. The mixture was stirred at an elevated temperature of about 60° C. Upon cooling wax crystals were precipitated from the mixture to form a dispersion of wax in the white oil.

The wax-containing white oil was passed through a charge injector and into a vessel such as shown in FIG. 2, except that the separation vessel contained no glass beads. The wax crystal size distribution upon sampling with an optical image analyzer and without charge injection is shown as the continuous curve in FIG. 5.

The size distribution had a mean value of 14µ diameter and 70% of the crystals were smaller than 20µ.

Figure 5:
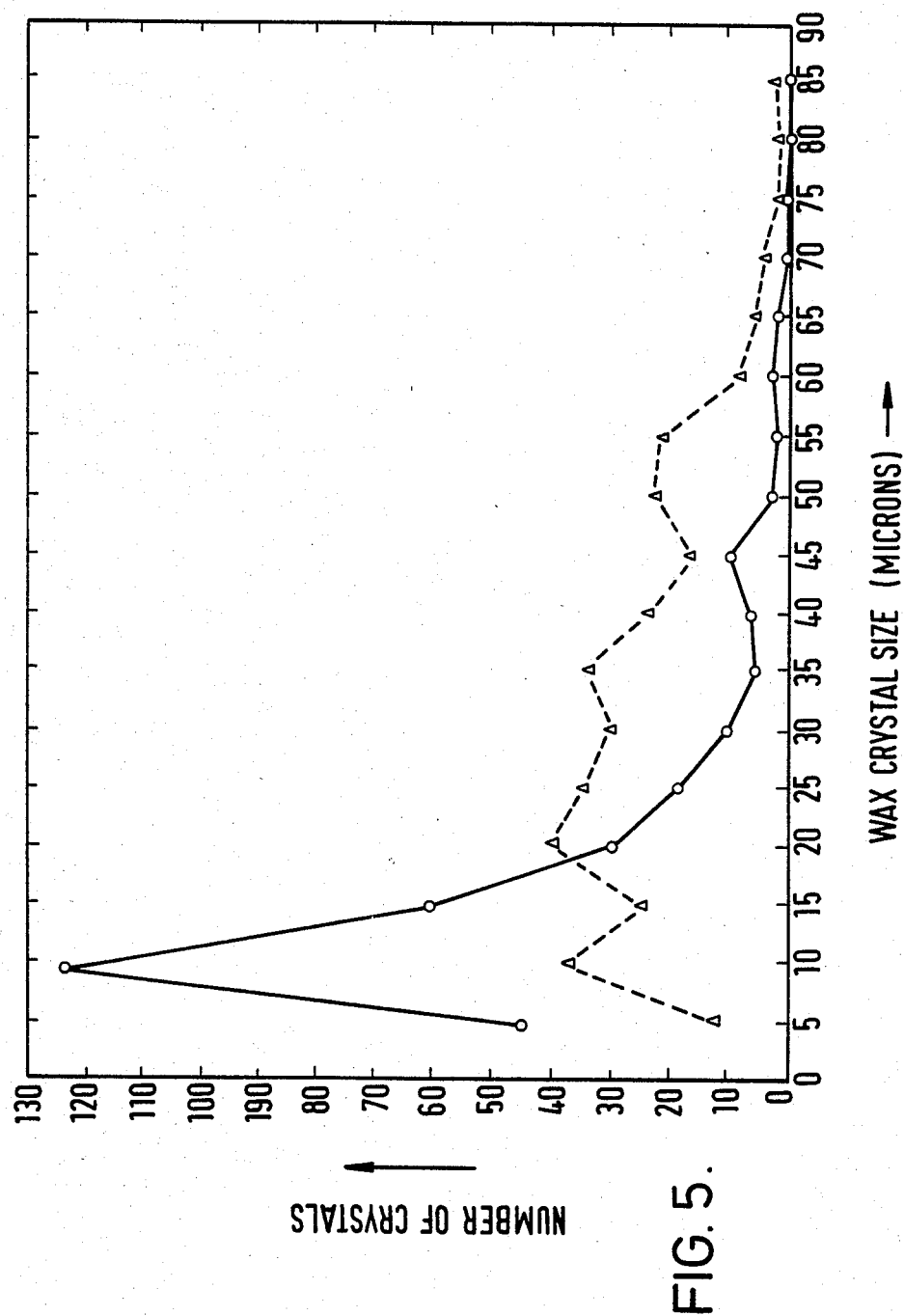
FIG. 5 presents experimental data showing the benefit of using charge injection for removing wax crystals from lube oil.

Subsequent to passing the two-phase mixture through the apparatus with charge injection occurring, the measured size distribution is shown on the dashed, broken line in FIG. 5. It can be seen that a significant amount of agglomeration occurred increasing the mean wax crystal size to 30µ with the particles below 20µ decreasing their fraction to 23%. The electrically separated wax crystals became deposited on the glass beads.

It should be understood that the foregoing disclosure and description are only illustrative and explanatory of the invention. Various changes in and modifications to the components of the inventive apparatus and methods as well as in the details of the illustrated apparatus and of the disclosed processes may be made within the scope of the appended claims without departing from the spirit of the invention.

What is claimed is:

1. A method of separating wax particles and/or water droplets from a hydrocarbon oil mixture boiling in the lubricating oil range, in which mixture the wax/water forms a dispersion, wherein free excess electric charge which is net unipolar is introduced into the wax/water-containing oil mixture and the charged wax/water-containing oil mixture and at least one collector surface are brought into contact with one another so that the wax/water collects, due to the electrophoretic migration of the wax/water caused by the introduced electric charge, and accumulates on said collector surface(s).

2. A method as claimed in claim 1, wherein the electric charge is introduced into the wax/water-containing hydrocarbon mixture by charge injection.

3. A method as claimed in claim 1, wherein the wax/water-containing oil mixture is introduced into a separation vessel having said collector surface(s) inside the separation vessel and the introduced electric charge causes migration of wax particles/water droplets in the wax/water-containing oil mixture in the separation vessel so that wax particles/water droplets collect on said collector surface(s) for separation from the oil mixture.

4. A method as claimed in claim 1 for separating wax particles from a hydrocarbon oil mixture boiling in the lubricating oil range, wherein a quantity of charged wax-containing oil mixture is maintained in contact with a moving collector surface so that wax deposits on said collector surface and is transported on said moving collector surface from said quantity of charged oil mixture.

5. A method as claimed in claim 4, wherein the wax transported on said moving collector surface from said quantity of charged oil mixture is scraped off the collector surface by a stationary scraper.

6. A method as claimed in claim 4, wherein the collector surface is an endless surface which is continuously moving so that the surface moves into contact with said quantity of charged oil mixture to collect a deposit of wax, transports the wax to a location where the wax deposit is mechanically substantially removed from the surface, and the thereby cleaned surface returns for contact again with said quantity of charged oil mixture.

7. A method of separating wax particles from a hydrocarbon oil mixture boiling in the lubricating oil range, the oil mixture containing at least dispersed wax particles, wherein the wax-containing oil mixture is introduced into a separation vessel containing a bed of packed collector beads, and free excess electric charge that is net-positive or net-negative is introduced by charge injection into the wax-containing oil mixture so as to cause wax particles to collect and accumulate on said beads, due to the electrophoretic migration of the wax/water caused by the introduced electric charge.

8. A method as claimed in claim 7, wherein said beads are periodically replaced by fresh beads whose outer surfaces are free of deposited wax.

9. A method as claimed in claim 7, wherein said beads are periodically regenerated to remove wax deposits from the surfaces thereof.

10. A method of separating water droplets from a hydrocarbon oil mixture boiling in the lubricating oil range, said oil mixture containing at least water droplets in dispersion and whose density is different from that of the water, wherein water-containing hydrocarbon oil mixture is introduced into a separation vessel containing a bed of packed collector beads, and free excess electric charge that is net-positive or net-negative is introduced by charge injection into the water-containing oil mixture so as to cause water droplets to collect on said beads, due to the electrophoretic migration of water droplets caused by the introduced electric charge, and coalesce on said beads until they become detached from said beads and separate from the oil mixture in the separation vessel to form into a layer of water in the separation vessel distinct from the oil mixture in the separation vessel.

11. Apparatus for separating wax particles from hydrocarbon mixture boiling in the lubricating oil range, in which mixture the wax forms a dispersion, comprising a rotary collector drum, providing an outer cylindrical wax collector surface, means arranged to rotate the drum about a substantially horizontal axis, means for introducing net-positive or net-negative free excess electric charge into the wax-containing oil mixture, and means for maintaining a quantity of charged wax-containing oil mixture in contact with the outer cylindrical surface of the collector drum, so as to cause wax particles to collect and deposit on the drum collector surface while the drum rotates, due to the electrophoretic migration of the wax particles caused by the introduced electric charge, and be separated by the drum rotation from said quantity of charged oil mixture.

12. Apparatus as claimed in claim 11, wherein said means for maintaining a quantity of charged wax-containing oil mixture in contact with the outer cylindrical surface of the collector drum comprises a trough inside which said rotary collector drum is positioned with its wax collector surface partially submerged in the charged oil mixture in the trough.

13. Apparatus as claimed in claim 11, comprising a scraper positioned immediately adjacent the drum collector surface for scraping deposited wax off the drum collector surface as the drum rotates.

14. Apparatus as claimed in claim 11, wherein means, including a bypass line, is provided for diverting a proportion of the wax-containing oil mixture from the free excess charge introducing means and recombining the uncharged diverted proportion with the remaining portion, when charged, whereby the charge becomes distributed within the recombined portions.

* * * * *

UNITED STATES PATENT AND TRADEMARK OFFICE
CERTIFICATE OF CORRECTION

PATENT NO. : 4,581,112

DATED : April 8, 1986

INVENTOR(S) : Donald J. Mintz et al

It is certified that error appears in the above-identified patent and that said Letters Patent is hereby corrected as shown below:

On the title page inventors should read

-- (75) Inventors: Donald J. Mintz; Anthony M. Gleason; Douglas G. Ryan --.

Signed and Sealed this

Second Day of September 1986

[SEAL]

Attest:

DONALD J. QUIGG

Attesting Officer

Commissioner of Patents and Trademarks